UNITED STATES PATENT OFFICE.

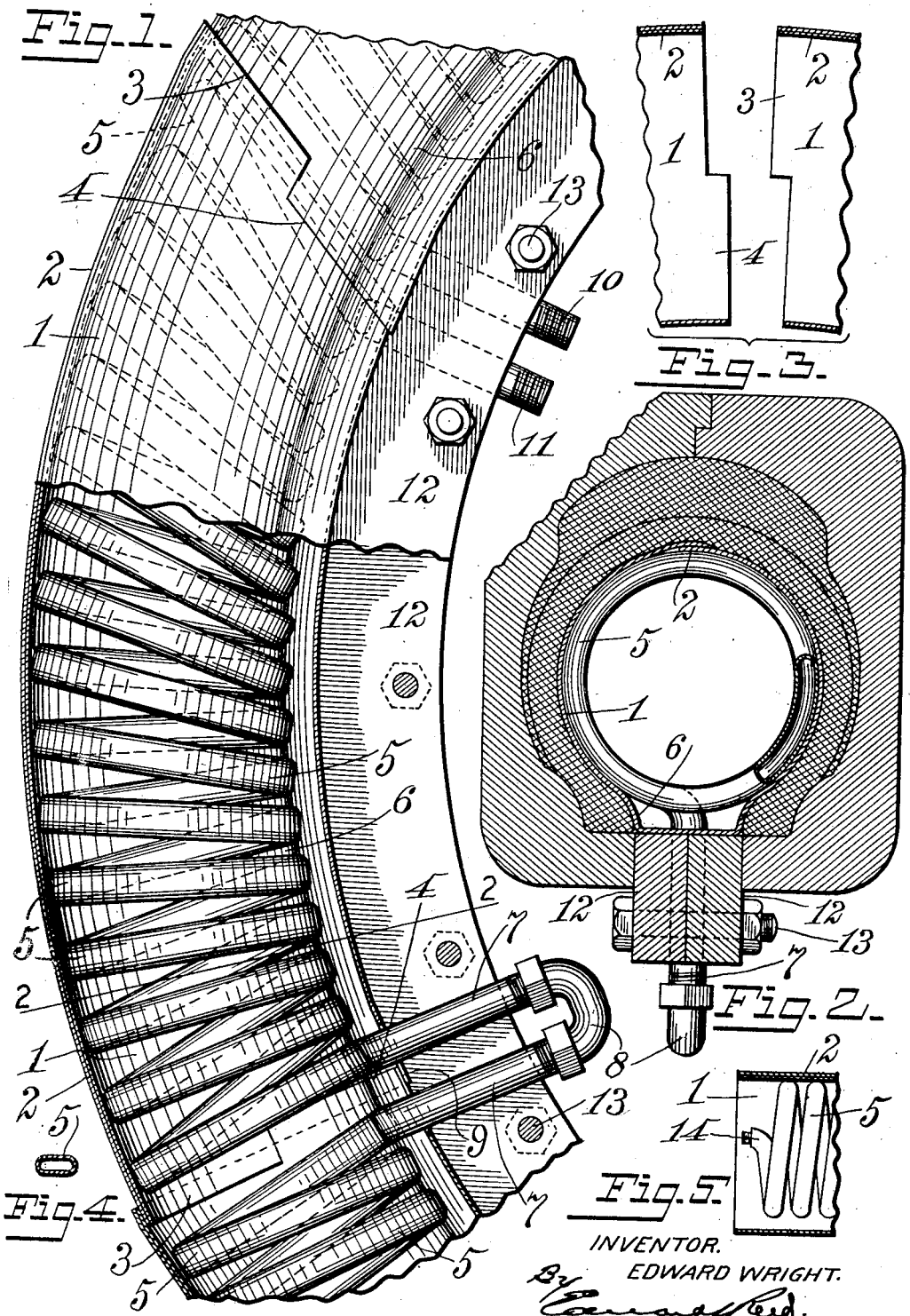

EDWARD WRIGHT, OF DAYTON, OHIO.

CORE FOR CURING TIRES.

1,370,391.  Specification of Letters Patent.  Patented Mar. 1, 1921.

Application filed January 3, 1921. Serial No. 434,504.

*To all whom it may concern:*

Be it known that I, EDWARD WRIGHT, a citizen of the United States, residing at Dayton, in the county of Montgomery and State of Ohio, have invented certain new and useful Improvements in Cores for Curing Tires, of which the following is a specification, reference being had therein to the accompanying drawing.

This invention relates to an expansible core for curing or vulcanizing pneumatic tires and the like.

In the manufacture of pneumatic tires it has been customary to cure the same on what is known as an air bag, which consists of a flexible annular tube adapted to be inserted in the carcass of the tire and adapted to receive fluid under pressure, such as air or steam, which expands the same against the walls of the carcass. These bags, or flexible cores, are expensive to build and are of short life and add materially to the cost of the tire. It has been proposed to provide an expansible metal bag constructed in sections to be inserted in the tire carcass and expanded against the walls thereof. Difficulty has been experienced, however, in providing a metal bag which will have uniform expansion throughout the length of each section, which can be readily inserted in and removed from the tire carcass and which will be inexpensive to manufacture.

The object of the present invention is to provide a metallic core which will be very simple in its construction and which can be built at a low cost.

A further object is to provide such a core which will have uniform expansion throughout the length of each section thereof and which can be readily inserted in and removed from the tire.

A further object of the invention is to provide an expansible core of this character upon which the tire may be built up and then cured thereon.

Other objects of the invention will appear as the core is described in detail.

In the accompanying drawings Figure 1 is a side elevation, partly in section, of a portion of an expansible metallic core embodying my invention; Fig. 2 is a transverse sectional view taken on the line 2—2 of Fig. 1; Fig. 3 is a longitudinal section taken through the abutting ends of two of the core sections; Fig. 4 is a transverse section of the tubular pressure element; and Fig. 5 is a sectional view of a portion of a core section showing a slight modification therein.

In these drawings I have illustrated one embodiment of my invention, together with a slight modification thereof, and have shown the same as comprising an expansible casing 1, which is preferably formed of sheet metal and, as here shown, consists of a single piece of resilient sheet metal bent to conform to the shape of the tire and having its edges overlapping, but disconnected one from the other, along the outer portion of the casing, as shown at 2, that is, along that portion of the casing adjacent to the tread of the tire. The casing is preferably formed of light weight metal so that the overlapping edges of the same do not form an objectionable projection on the surface of the casing. Where the core is to be used for curing a tire carcass as a whole the casing must be made up in sections so that it can be inserted in and removed from the carcass, and the ends of the sections, as shown in Fig. 1, abut one against the other. The joints between the abutting sections are radial with the exception of those of one section which must be inclined to the radius of the core in such a manner as to permit this one section to be drawn inwardly, thereby collapsing the core and permitting the other sections to be removed. Preferably the ends of the abutting sections overlap to form a continuous supporting surface for the carcass. As here shown, each section of the tire has its upper portion projecting beyond one end thereof, as shown at 3, and its lower portion projecting beyond the other end thereof, as shown at 4, the projecting portions being substantially semicircular in shape, and when the adjacent ends of the two sections are brought into abutting engagement the upper portion of the one section will overlap the upper portion of the other and the lower portion of said other section will overlap the lower portion of the first mentioned section.

In order to expand the casing tightly against the wall of the carcass I have inserted therein a pressure element which is preferably tubular in form and adapted to receive fluid under pressure, such as compressed air or steam, which will so act on the pressure element as to extend or expand the same and thus exert outward pressure on the walls of the casing, expanding the same against the carcass. In the preferred form of the pressure element it comprises a metallic tube 5 of relatively small diameter which is coiled within the casing in such a manner that it will engage the walls thereof. In the present construction, I have shown this tube as coiled about an axis extending lengthwise of the casing, the coils being substantially circular and of such a diameter that they will bear against the walls of the tire carcass. The casing being shaped to conform to the shape of the tire, has an inwardly extending portion 6 arranged between the beads of the tire carcass, but I have not found it necessary to shape the pressure element to fit into this portion of the casing, as the pressure on the adjacent portions thereof will be ample to expand the non-circular portion of the casing to the desired extent. The tube is more or less flexible in character and, as shown in Fig. 4 is flattened and when steam or air under pressure is introduced into the same it will extend or expand, within the casing, thus exerting outward pressure thereon. It will be understood that the expansion necessary to be imparted to the casing is very slight, usually not over one-eighth of an inch and, consequently, a large degree of expansibility is not necessary to the proper operation of the pressure element. The ends of the coils of adjacent sections are connected one to the other so as to form a continuous pressure element extending entirely about the annular casing. As here shown, the ends of the tubes extend inwardly through the casing near the end thereof, as shown at 7, and are connected one to the other by a U-shaped coupling 8. If desired, the ends of the openings in the casing may be in the form of slots, as shown at 9, so that the coil may be readily withdrawn from the casing. The coil being of flexible character it will be apparent that the projecting portion 7 at one end thereof may be bent into line with the body of the coil so that the coil as a whole may be drawn through the casing toward the opposite end thereof. Fluid under pressure may be introduced into the pressure element in any suitable manner but I prefer that the outwardly projecting portions of the coils at one of the joints shall constitute an inlet tube and an outlet tube, as shown at 10 and 11 in Fig. 1, the inlet tube being adapted to be connected with the source of supply for fluid under pressure and the outlet tube being controlled in any suitable manner. It will be noted that the helical coil is well adapted to application to the segmental sections of the casing as it will conform itself readily to the curved shape of the sections and the outer portions of the end coils may be positioned near the outer edges of the sections, thus causing the pressure to be exerted uniformly at all points along the length of the casing. The several sections of the casing may be fastened together, to form an annular core, in any suitable manner, but, as here shown, I have embodied two clamping rings 12 of an outer diameter substantially that of the inner diameter of the casing so that they will abut against the inner circumference of the casing. These clamping rings are recessed to receive the projecting portions 7 of the coils and when clamped onto these projecting portions by means of bolts 13 they will rigidly connect the sections one to the other, it being understood, of course, that the clamping rings are applied to the core after the several sections have been inserted in the carcass of the tire.

When the core is used for repair purposes or where it is desired to vulcanize a portion only of the tire a single section is used and this section corresponds substantially in construction to that above shown and described, but instead of having the ends of the core 5 extended through the inner walls of the casing these ends are arranged centrally of the coil, as shown at 14 in Fig. 5, so that the inlet and exhaust connections may be established at the ends of the core section, as in this way they do not interfere with the application of the usual vulcanizing molds to the tire, and, further, do not project outwardly in such a manner as to be liable to injury should the core be subjected to rough usage.

It will be apparent from the foregoing description that I have provided a very simple and very efficient expansible metallic core and that this core can be produced at a very low cost as it includes but few parts and these are of such a character that they can be quickly and inexpensively manufactured. Further, the core is of such a character that it can be very easily placed within the tire and the several sections assembled to form a single core. Moreover, the core is of a very strong, durable character and has no parts which are liable to wear out and thus shorten the life of the tire. The only place where a leak might occur is, of course, in the tubular coil and this coil can be readily withdrawn for repair.

While I have shown and described one embodiment of my invention, I wish it to be understood that I do not desire to be limited to the details thereof as various modifications may occur to a person skilled in the art.

Having now fully described my invention what I claim as new and desire to secure by Letters Patent is:

1. In a vulcanizing core for tires and the like, an expansible casing, a pressure element mounted within said casing and means for introducing fluid under pressure into said pressure element to cause the same to exert outward pressure on said expansible casing.

2. In a vulcanizing core for tires and the like, an expansible casing of resilient metal, a tubular pressure element mounted within said casing, and means for introducing fluid under pressure into said pressure element to cause the same to exert outward pressure on the wall of said casing.

3. In a vulcanizing core for tires and the like, an expansible casing, a plurality of coils of tubing arranged within said casing to engage the walls thereof, and means for introducing fluid under pressure into said coils.

4. In a vulcanizing core for tires and the like, an expansible casing, tubing mounted within said casing, coiled about an axis extending lengthwise of said casing, and arranged to engage the walls thereof, and means for introducing fluid under pressure into said tubing.

5. In a vulcanizing core for tires and the like, an expansible casing comprising a plurality of segmental sections adapted to be assembled with their adjacent ends abutting one against the other, a section of tubing coiled in each section of said casing, means for connecting said coils one to the other at the adjacent ends of the sections of said casing, and means for introducing fluid under pressure into said coil.

6. In a vulcanizing core for tires and the like, an expansible casing comprising a plurality of segmental sections adapted to be assembled in annular form with their adjacent ends abutting one against the other, a plurality of coils of flexible tubing arranged in each section of said casing, said tubing being coiled about an axis extending lengthwise of said sections, the ends of the tubing in each section extending inwardly through the wall of said casing, means for connecting the ends of the tubing of the respective sections of said casing, and means for introducing fluid under pressure into said tubing.

7. In a vulcanizing core for tires and the like, an expansible casing comprising a plurality of segmental sections adapted to be assembled in annular form with their adjacent ends abutting one against the other, a plurality of coils of flexible tubing arranged in each section of said casing, said tubing being coiled about an axis extending lengthwise of said sections, the ends of the tubing in each section extending inwardly through the wall of said casing, means for connecting the ends of the tubing of the respective sections of said casing, and means for introducing fluid under pressure into said tubing, and clamping rings arranged to engage the inner circumference of said annular casing and to be clamped onto the inwardly projecting ends of said tubing.

8. In a vulcanizing core for tires and the like, an expansible casing having its wall divided along the outer portion thereof, the edges of said wall being arranged to overlap to form a continuous supporting surface, and tubing coiled within said casing and arranged to bear against the walls thereof, and means to introduce fluid under pressure into said tubing.

9. In a vulcanizing core for tires and the like, an expansible casing comprising a plurality of segmental sections having their adjacent ends abutting one against the other and provided with overlapping portions, a tubular conduit coiled in each section of said casing and arranged to engage the walls thereof, means for connecting the conduits of adjacent sections one to the other, and means for introducing fluid under pressure into said conduits.

In testimony whereof I affix my signature hereto.

EDWARD WRIGHT.